US012611914B2

(12) United States Patent
Mukai et al.

(10) Patent No.: US 12,611,914 B2
(45) Date of Patent: Apr. 28, 2026

(54) THERMAL MANAGEMENT SYSTEM, THERMAL MANAGEMENT METHOD, AND COMPUTER DEVICE

(71) Applicant: TOYOTA JIDOSHA KABUSHIKI KAISHA, Toyota (JP)

(72) Inventors: Daisuke Mukai, Sunto-gun (JP); Kunihiko Hayashi, Odawara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/385,432

(22) Filed: Oct. 31, 2023

(65) Prior Publication Data

US 2024/0190212 A1 Jun. 13, 2024

(30) Foreign Application Priority Data

Dec. 7, 2022 (JP) ................................. 2022-195450

(51) Int. Cl.
*B60H 1/00* (2006.01)
(52) U.S. Cl.
CPC ................................ *B60H 1/00899* (2013.01)
(58) Field of Classification Search
CPC ................................................. B60H 1/00899
See application file for complete search history.

(56) References Cited

U.S. PATENT DOCUMENTS

| | | | |
|---|---|---|---|
| 11,110,772 B2 | 9/2021 | Oh et al. | |
| 11,472,255 B2 | 10/2022 | Tisdale et al. | |
| 2010/0055553 A1* | 3/2010 | Kimura | H01M 10/613 |
| | | | 429/120 |
| 2022/0088992 A1 | 3/2022 | Tisdale et al. | |
| 2022/0379681 A1* | 12/2022 | Kim | B60H 1/00485 |

FOREIGN PATENT DOCUMENTS

| | | | | |
|---|---|---|---|---|
| CN | 108407568 A | * | 8/2018 | ........ B60H 1/00007 |
| CN | 113659230 A | | 11/2021 | |
| WO | 2017/017867 A1 | | 2/2017 | |

OTHER PUBLICATIONS

CN-108407568-A translation.*

* cited by examiner

*Primary Examiner* — Elizabeth J Martin
(74) *Attorney, Agent, or Firm* — OLIFF PLC

(57) ABSTRACT

A thermal management system includes a first channel through which a first refrigerant flows so as to cool a power storage device mounted on a vehicle, a second channel through which a second refrigerant flows so as to cool a drive device that causes the vehicle to travel, a third channel through which a third refrigerant that is cooled by a refrigeration cycle flows, and a heat exchanger connected to the first channel, the second channel, and the third channel. The first channel, the second channel, and the third channel are provided independently of each other. The heat exchanger is configured to mutually exchange heat among the first refrigerant, the second refrigerant, and the third refrigerant.

11 Claims, 9 Drawing Sheets

<<THREE-FLUID HEAT EXCHANGE>>

<<TWO-FLUID HEAT EXCHANGE:
FIRST CHANNEL AND
THIRD CHANNEL>>

THERMAL MANAGEMENT SYSTEM, THERMAL MANAGEMENT METHOD, AND COMPUTER DEVICE

CROSS-REFERENCE TO RELATED APPLICATION

This application claims priority to Japanese Patent Application No. 2022-195450 filed on Dec. 7, 2022, incorporated herein by reference in its entirety.

BACKGROUND

1. Technical Field

The present disclosure relates to a thermal management system, a thermal management method, and a computer device.

2. Description of Related Art

WO2017/017867 discloses a technology for cooling a battery with insulating oil.

SUMMARY

According to the technology described in WO2017/017867, the battery (power storage device) can be cooled appropriately. In WO2017/017867, however, sufficient research is not conducted from the viewpoint of appropriately performing wide-range thermal management for a vehicle (for example, thermal management for the entire vehicle) with a thermal management system having a simple structure.

The present disclosure provides a thermal management system having a simple structure to appropriately perform wide-range thermal management for a vehicle.

A thermal management system according to a first aspect of the present disclosure includes a first channel through which a first refrigerant flows so as to cool a power storage device mounted on a vehicle, a second channel through which a second refrigerant flows so as to cool a drive device that causes the vehicle to travel, a third channel through which a third refrigerant that is cooled by a refrigeration cycle flows, and a heat exchanger connected to the first channel, the second channel, and the third channel. The first channel, the second channel, and the third channel are provided independently of each other. The heat exchanger is configured to mutually exchange heat among the first refrigerant, the second refrigerant, and the third refrigerant.

According to the above configuration, the power storage device and the drive device can be cooled by the third refrigerant that is cooled by the refrigeration cycle because the heat exchanger exchanges heat among the first refrigerant, the second refrigerant, and the third refrigerant. Since the first channel, the second channel, and the third channel are provided independently of each other, it is easier to individually regulate the channels to appropriate temperatures. Thus, it is possible to appropriately perform wide-range thermal management for the vehicle (for example, thermal management in a range including the power storage device and the drive device). Since all the first refrigerant, the second refrigerant, and the third refrigerant flow into the common heat exchanger and heat is exchanged among the first refrigerant, the second refrigerant, and the third refrigerant by one heat exchanger, the structure of the thermal management system is simplified and the cost is reduced.

The vehicle including the power storage device and the drive device may be an electrified vehicle that uses electric power as a power source in whole or in part. The drive device may function as a transaxle or a powertrain of the vehicle. The drive device may include a motor that generates power for traveling of the vehicle, and a drive circuit (for example, an inverter) that drives the motor by using electric power supplied from the power storage device. Examples of the electrified vehicle include a battery electric vehicle (BEV), a hybrid electric vehicle (HEV), a plug-in hybrid electric vehicle (PHEV), and a fuel cell electric vehicle (FCEV).

The thermal management system according to the first aspect of the present disclosure may further include an air conditioner configured to condition air in an interior of the vehicle through the refrigeration cycle. The first refrigerant may be insulating oil. The second refrigerant may be water or an aqueous solution. The third refrigerant may be a refrigerant that is used so as to condition the air.

The first channel, the second channel, and the third channel may be separated and need not communicate with each other. Therefore, different types of refrigerant can be used in the first channel, the second channel, and the third channel as described above. In the above configuration, the insulating oil may be used as the first refrigerant for cooling the power storage device. Thus, it is easier to cool the power storage device appropriately while suppressing conduction of the power storage device. The drive device can be cooled by a coolant (water or aqueous solution) that is inexpensive and easy to handle. Since the refrigeration cycle of the air conditioner may be used, there is no need to add a special refrigeration cycle (for example, a refrigeration cycle for thermal management) to the vehicle.

The thermal management system according to the first aspect of the present disclosure may further include a first pump configured to circulate the first refrigerant in a first fluid circuit provided by the first channel, a second pump configured to circulate the second refrigerant in a second fluid circuit provided by the second channel, and a third pump configured to circulate the third refrigerant in a third fluid circuit provided by the third channel.

According to the above configuration, it is easier to control the circulation of the refrigerants in the channels because the pumps may be provided individually for the first channel, the second channel, and the third channel.

The thermal management system according to the first aspect of the present disclosure may further include a regulating valve. The second channel may include a first portion passing through the drive device, a second portion passing through the heat exchanger from a first end of the first portion and connected to a second end of the first portion, and a third portion connected to the second end of the first portion from the first end of the first portion without passing through the heat exchanger. The regulating valve may be configured to regulate a ratio between an amount of the second refrigerant flowing into the second portion and an amount of the second refrigerant flowing into the third portion.

Since the regulating valve may regulate the ratio between the amount of the second refrigerant flowing into the second portion and the amount of the second refrigerant flowing into the third portion, it is easier to control the cooling of the drive device by the second refrigerant and the heat exchange between the second refrigerant and the other refrigerants.

In the thermal management system according to the first aspect of the present disclosure, the regulating valve may be a three-way valve connected to the first portion, the second portion, and the third portion.

According to the above configuration, the single regulating valve (three-way valve) can regulate the ratio between the amount of the second refrigerant flowing into the second portion and the amount of the second refrigerant flowing into the third portion even though a valve for regulating the amount of the second refrigerant flowing into the second portion and a valve for regulating the amount of the second refrigerant flowing into the third portion are not provided separately.

The thermal management system according to the first aspect of the present disclosure may further include a first temperature sensor configured to detect, in the first fluid circuit, a temperature of the first refrigerant pumped out by the first pump after passage through the heat exchanger and the power storage device, a second temperature sensor configured to detect, in the second fluid circuit, a temperature of the second refrigerant pumped out by the second pump before passage through the drive device, and a control device configured to control the regulating valve by using the temperature detected by the first temperature sensor and the temperature detected by the second temperature sensor.

According to the above configuration, it is easier for the control device to appropriately control the regulating valve based on the temperature detected by first temperature sensor and the temperature detected by the second temperature sensor.

In the thermal management system according to the first aspect of the present disclosure, the control device may be configured to acquire a requested cooling index indicating a requested cooling degree of the power storage device, determine a target flow rate by using the temperature detected by the first temperature sensor, the temperature detected by the second temperature sensor, and the requested cooling index, and control the regulating valve so as to cause the amount of the second refrigerant flowing into the second portion to approach the target flow rate.

A thermal management method according to a second aspect of the present disclosure for managing heat in the vehicle by using the thermal management system may include operating all the first pump, the second pump, and the third pump and controlling the regulating valve so as to cause the second refrigerant to flow into the second portion when a first condition related to a state of the vehicle is satisfied, stopping the third pump, operating the first pump and the second pump, and controlling the regulating valve so as to cause the second refrigerant to flow into the second portion when the first condition is not satisfied and a second condition related to the state of the vehicle is satisfied, operating all the first pump, the second pump, and the third pump and controlling the regulating valve to cause the second refrigerant not to flow into the second portion when the first condition is not satisfied and a third condition related to the state of the vehicle is satisfied, and stopping the first pump, operating the second pump and the third pump, and controlling the regulating valve so as to cause the second refrigerant to flow into the second portion when the first condition is not satisfied and a fourth condition related to the state of the vehicle is satisfied.

According to the thermal management method of the second aspect of the present disclosure, it is possible to change the mode of heat exchange in the heat exchanger depending on the state of the vehicle. Thus, it is easier to perform thermal management appropriate to the state of the vehicle.

A thermal management method according to a third aspect of the present disclosure for managing heat in the vehicle by using the thermal management system may include acquiring a temperature of the first refrigerant flowing into the heat exchanger, acquiring a temperature of the second refrigerant flowing into the heat exchanger, acquiring a requested cooling index indicating a requested cooling degree of the power storage device, determining a target value of a flow rate of the second refrigerant flowing into the second portion by using the temperature of the first refrigerant, the temperature of the second refrigerant, and the requested cooling index, and controlling the regulating valve so as to cause the amount of the second refrigerant flowing into the second portion to approach the determined target value.

According to the thermal management method of the third aspect of the present disclosure, it is easier to adjust a thermal balance (for example, a temperature difference) between the first refrigerant and the second refrigerant to an appropriate balance.

A computer device according to a fourth aspect of the present disclosure may include a processor and a storage device storing a program which causes the processor to execute the thermal management method.

According to the computer device of the fourth aspect of the present disclosure, the thermal management method is executed appropriately. According to one aspect, a program for causing a computer to execute the thermal management method may be provided. According to another aspect, a computer device configured to distribute the program may be provided.

According to the present disclosure, it is possible to appropriately perform the wide-range thermal management for the vehicle with the thermal management system having the simple structure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described in detail with reference to the drawings. The same or corresponding parts are denoted by the same signs throughout the drawings, and description thereof will not be repeated.

Figure 1:
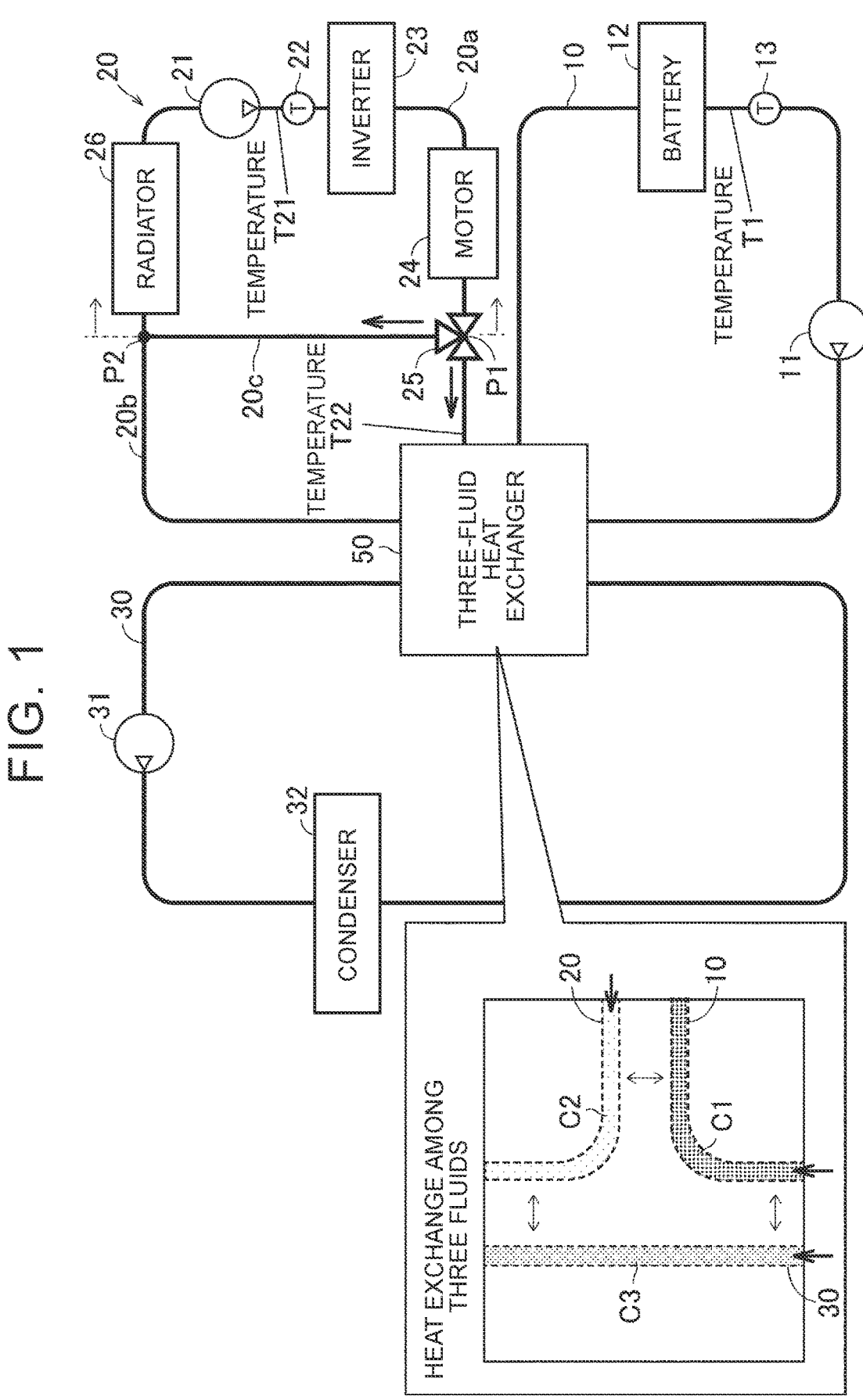
FIG. 1 shows the configuration of a thermal management system according to an embodiment of the present disclosure.

FIG. 1 shows the configuration of a thermal management system according to the present embodiment. Referring to FIG. 1, the thermal management system according to the present embodiment is applied to, for example, an electrified vehicle. The thermal management system includes a first channel 10, a second channel 20, a third channel 30, and a heat exchanger 50.

A first refrigerant C1 flows through the first channel 10 to cool a battery 12. The battery 12 corresponds to a power storage device mounted on the vehicle and functions as a power source of the electrified vehicle. The first refrigerant C1 is a refrigerant for a battery. In the present embodiment, insulating oil is employed as the first refrigerant C1. By using the insulating oil as the first refrigerant C1 for cooling the battery 12, conduction of the battery 12 is less likely to occur even in a configuration in which the first channel 10 is formed to pass through the battery 12 to enhance the cooling effect. Therefore, it is easier to cool the battery 12 appropriately while suppressing the conduction of the battery 12 (abnormality related to electrical performance).

A first pump 11 is provided in a first fluid circuit formed by the first channel 10. The first pump 11 circulates the first refrigerant C1 in the first fluid circuit. The heat exchanger 50, the battery 12, and a temperature sensor 13 are provided in this order from the first pump 11 to a downstream side in the first fluid circuit. The battery 12 is cooled by the first refrigerant C1 flowing through the first fluid circuit. The temperature sensor 13 detects a temperature T1 of the first refrigerant C1 at an outlet of the battery 12 (after cooling).

A second refrigerant C2 flows through the second channel 20 to cool a drive device that causes the vehicle to travel. The drive device includes an inverter 23 and a motor 24, and causes the vehicle to travel by using electric power supplied from the battery 12. The drive device functions as a powertrain (PT) of the vehicle. The motor 24 functions as a traveling motor. The second refrigerant C2 is a refrigerant for a powertrain. In the present embodiment, water or an aqueous solution is employed as the second refrigerant C2. The drive device of the vehicle can appropriately be cooled by the coolant that is inexpensive and easy to handle.

A second pump 21 is provided in a second fluid circuit formed by the second channel 20. The second pump 21 circulates the second refrigerant C2 in the second fluid circuit. The second channel 20 includes a first portion 20a passing through the drive device (inverter 23 and motor 24) of the vehicle, a second portion 20b passing through the heat exchanger 50 from a first end P1 of the first portion 20a and connected to a second end P2 of the first portion 20a, and a third portion 20c (bypass path) connected to the second end P2 of the first portion 20a from the first end P1 of the first portion 20a without passing through the heat exchanger 50.

In a fluid circuit (second fluid circuit A) formed by the first portion 20a and the second portion 20b, a temperature sensor 22, the inverter 23, the motor 24, a regulating valve 25, the heat exchanger 50, and a radiator 26 are provided in this order from the second pump 21 to a downstream side. The heat exchanger 50 is not included in a fluid circuit (second fluid circuit B) formed by the first portion 20a and the third portion 20c.

The second pump 21 is positioned in the first portion 20a. The drive device (inverter 23 and motor 24) of the vehicle is also positioned in the first portion 20a and cooled by the second refrigerant C2 flowing through the first portion 20a. The temperature sensor 22 is also positioned in the first portion 20a (more specifically, between the second pump 21 and the inverter 23), and detects a temperature T21 of the second refrigerant C2 at an inlet of the drive device of the vehicle (before cooling).

The regulating valve 25 is positioned at the first end P1 of the first portion 20a. The regulating valve 25 is, for example, a three-way valve. The regulating valve 25 is configured to regulate the ratio between the amount of the second refrigerant C2 flowing from the first portion 20a to the second portion 20b (hereinafter also referred to as "non-bypass amount") and the amount of the second refrigerant C2 flowing from the first portion 20a to the third portion 20c (hereinafter also referred to as "bypass amount"). The regulating valve 25 may change the ratio between the non-bypass amount and the bypass amount by changing at least one of the non-bypass amount and the bypass amount. In the present embodiment, the non-bypass amount increases and the bypass amount decreases as the opening degree of the regulating valve 25 increases (see FIG. 2 described later).

The radiator 26 is positioned in the first portion 20a and cools (dissipates heat of) on-vehicle components. When the temperature of the radiator 26 is low, the radiator 26 cools the second refrigerant C2. When the temperature of the radiator 26 is high, the radiator 26 is cooled by the second refrigerant C2. The radiator 26 may be cooled by wind (natural draft) caused by traveling of the vehicle.

A third refrigerant C3 that is cooled by a refrigeration cycle of an on-vehicle device flows through the third channel 30. In the present embodiment, the third refrigerant C3 is cooled by a refrigeration cycle of an air conditioner. The air conditioner includes a condenser 32 and conditions air in the vehicle (in the interior of the vehicle) through a refrigeration cycle (that is, a cycle of evaporation, compression, condensation, and expansion steps). By using the refrigeration cycle of the air conditioner mounted on the vehicle (for example, the electrified vehicle), there is no need to add a special refrigeration cycle (for example, a refrigeration cycle for thermal management) to the vehicle. The third refrigerant C3 is a refrigerant for air conditioning. Examples of the refrigerant for air conditioning include a hydrofluorocarbon refrigerant such as R-134a, a hydrofluoroolefin refrigerant such as R-1234yf, carbon dioxide ($CO_2$) such as R744, and propane gas.

Heat exchange between the refrigeration cycle of the air conditioner and the third refrigerant C3 is performed via the condenser 32. The condenser 32 may perform the condensation step in the refrigeration cycle. In the present embodiment, the air conditioner further includes a compressor for the compression step, an expansion valve for the expansion step, an evaporator for the evaporation step, and a heat pump system (none of which is shown). The heat pump is a technology for collecting heat and utilizing it as large thermal energy. The heat pump system can heat the interior of the vehicle by using, for example, heat in the air and waste heat from on-vehicle components.

A third pump 31 is provided in a third fluid circuit formed by the third channel 30. The third pump 31 circulates the third refrigerant C3 in the third fluid circuit. The condenser 32 and the heat exchanger 50 are provided in this order from the third pump 31 to a downstream side in the third fluid circuit. The condenser 32 cools (dissipates heat of) the third refrigerant C3 flowing through the third fluid circuit. The condenser 32 may cool the third refrigerant C3 with wind of a condenser fan.

The heat exchanger 50 is connected to the first channel 10, the second channel 20, and the third channel 30. The heat exchanger 50 functions as a three-fluid heat exchanger and mutually exchanges heat among the first refrigerant C1, the second refrigerant C2, and the third refrigerant C3. The heat exchanger 50 may be, for example, a plate-type heat exchanger. The heat exchange method is not limited to the plate method. Any one method selected from among various known heat exchange methods depending on a purpose may be applied to the heat exchanger 50.

In the present embodiment, the first channel 10, the second channel 20, and the third channel 30 are formed independently of each other. The first channel 10, the second channel 20, and the third channel 30 are separated and do not communicate with each other. Therefore, different types of refrigerant can be used in the first channel 10, the second channel 20, and the third channel 30.

A control device and a thermal management method of the thermal management system according to the present embodiment will be described below with reference to FIGS. 2 to 8.

Figure 2:
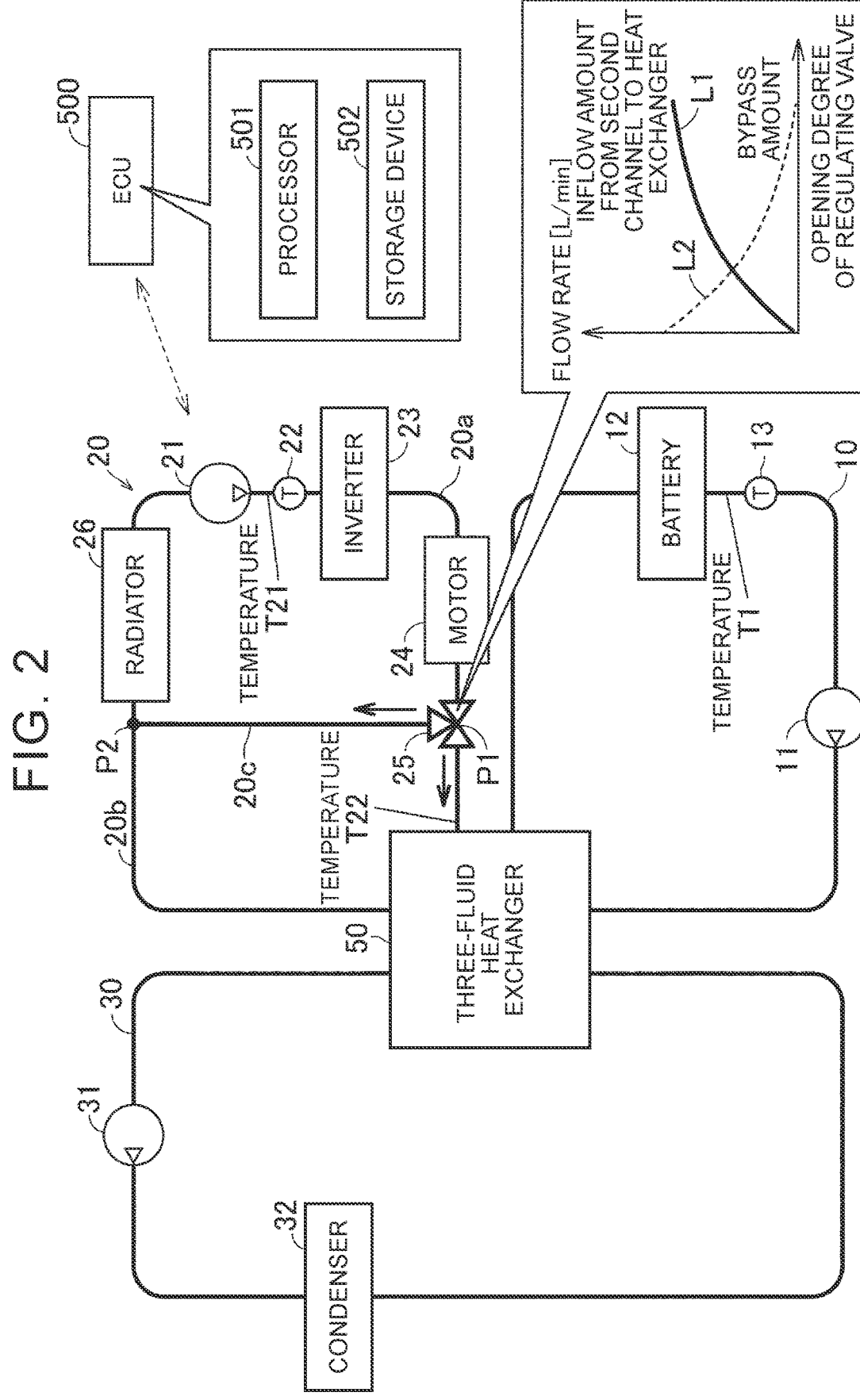
FIG. 2 illustrates a control device of the thermal management system according to the embodiment of the present disclosure.

FIG. 2 illustrates the control device of the thermal management system according to the present embodiment. Referring to FIG. 2 together with FIG. 1, the thermal management system according to the present embodiment further includes an electronic control unit (ECU) 500. The ECU 500 includes, for example, a computer and functions as a vehicle control device. The ECU 500 controls the drive device (for example, the inverter 23) of the vehicle. The ECU 500 includes a processor 501 and a storage device 502. The processor 501 may include a central processing unit (CPU). The storage device 502 is configured to save stored information. The storage device 502 stores programs and information to be used in the programs (for example, maps, mathematical expressions, and various parameters). In the present embodiment, the processor 501 executes the programs stored in the storage device 502 to perform thermal management in the vehicle. The air conditioner is also controlled by the ECU 500.

The first pump 11, the second pump 21, and the third pump 31 are controlled by the ECU 500. Since the pump (first pump 11, second pump 21, and third pump 31) is individually installed in the first channel 10, the second channel 20, and the third channel 30, the ECU 500 can easily control the circulation of the refrigerants (first refrigerant C1, second refrigerant C2, and third refrigerant C3) in the channels.

The regulating valve 25 is controlled by the ECU 500. In the present embodiment, a three-way valve connected to the first portion 20*a*, the second portion 20*b*, and the third portion 20*c* is employed as the regulating valve 25. According to such a configuration, the single regulating valve (three-way valve) can regulate the ratio between the amount of the second refrigerant C2 flowing into the second portion 20*b* and the amount of the second refrigerant C2 flowing into the third portion 20*c* even though a valve for regulating the amount of the second refrigerant C2 flowing into the second portion 20*b* and a valve for regulating the amount of the second refrigerant C2 flowing into the third portion 20*c* are not provided separately.

In a graph shown in FIG. 2, lines L1, L2 indicate an example of the characteristics of the regulating valve 25. The line L1 indicates a relationship between the opening degree of the regulating valve 25 and the non-bypass amount (inflow amount from the second channel 20 to the heat exchanger 50). As indicated by the line L1, the amount of the second refrigerant C2 flowing from the first portion 20*a* toward the second portion 20*b* (toward the heat exchanger 50) increases as the opening degree of the regulating valve 25 increases. The line L2 indicates a relationship between the opening degree of the regulating valve 25 and the bypass amount. As indicated by the line L2, the amount of the second refrigerant C2 flowing from the first portion 20*a* toward the third portion 20*c* (bypassing the heat exchanger 50) (bypass amount) decreases as the opening degree of the regulating valve 25 increases. In this manner, the regulating valve 25 reduces the ratio of the bypass amount to the non-bypass amount (=bypass amount/non-bypass amount) as the opening degree of the regulating valve 25 increases. The ECU 500 can regulate the ratio between the amount of the second refrigerant C2 flowing into the second portion 20*b* and the amount of the second refrigerant C2 flowing into the third portion 20*c* by using the regulating valve 25. According to such a configuration, it is easier to control the cooling of the drive device (inverter 23 and motor 24) by the second refrigerant C2 and the heat exchange between the second refrigerant C2 and the other refrigerants (first refrigerant C1 and third refrigerant C3) in the heat exchanger 50.

In the first fluid circuit, the temperature sensor 13 detects the temperature T1 of the first refrigerant C1 pumped out by the first pump 11 after the passage through the heat exchanger 50 and the battery 12 (power storage device). The temperature sensor 13 is an example of a "first temperature sensor" according to the present disclosure. In the first portion 20*a* of the second fluid circuit, the temperature sensor 22 detects the temperature T21 of the second refrigerant C2 pumped out by the second pump 21 before the passage through the drive device (inverter 23 and motor 24). The temperature sensor 22 is an example of a "second temperature sensor" according to the present disclosure. The detected values of the temperature sensors 13, 22 are input to the ECU 500 (control device). The ECU 500 controls the regulating valve 25 by using the detected values of the temperature sensors 13, 22.

Figure 3:
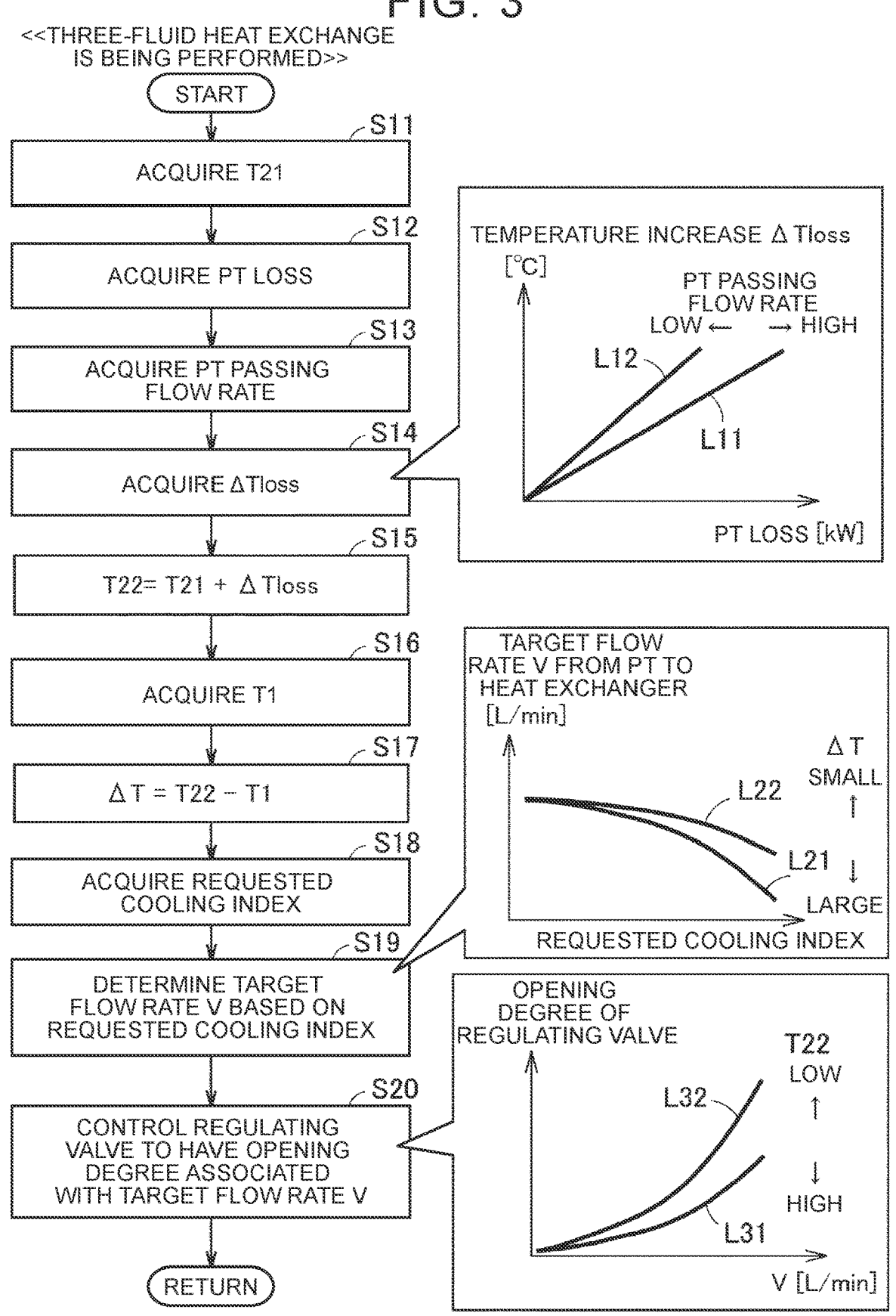
FIG. 3 is a flowchart showing a method for controlling a regulating valve according to the embodiment of the present disclosure.

FIG. 3 is a flowchart showing a method for controlling the regulating valve 25 according to the present embodiment. The process shown in this flowchart is repeated by the ECU 500. The symbol "S" in the flowchart means "step".

Referring to FIG. 3 together with FIGS. 1 and 2, the ECU 500 acquires the temperature T21 detected by the temperature sensor 22 in S11. In S12, the ECU 500 uses, for example, a map to determine a vehicle powertrain loss (hereinafter referred to as "PT loss") from an operation state of the vehicle (for example, a rotation speed and torque of the motor 24).

In S13, the ECU 500 determines the flow rate of the second refrigerant C2 passing through the drive device (inverter 23 and motor 24) of the vehicle. In the present embodiment, the second refrigerant C2 flowing through the first portion 20*a* cools the drive device of the vehicle by passing through the drive device. The ECU 500 estimates the flow rate of the second refrigerant C2 passing through the drive device of the vehicle, for example, based on a drive signal (for example, a duty ratio) to the second pump 21 and the opening degree of the regulating valve 25. The flow rate obtained in S13 corresponds to the flow rate of the second refrigerant C2 passing through the powertrain of the vehicle. The flow rate obtained in S13 will hereinafter be referred to as "PT passing flow rate". If the disadvantage in terms of cost can be accepted, a flow meter may be provided in the first portion 20a to actually measure the PT passing flow rate.

In S14, the ECU 500 determines the amount of temperature increase of the second refrigerant C2 due to the PT loss (hereinafter referred to as "ΔTloss"). Specifically, the ECU 500 acquires ΔTloss associated with the PT loss and the PT passing flow rate by using, for example, a map (lines L11, L12) shown in FIG. 3. The temperature of the second refrigerant C2 basically increases as the PT loss increases. The temperature of the second refrigerant C2 does not easily increase as the PT passing flow rate (the flow rate of the second refrigerant C2 passing through the powertrain) increases. In the above map, the degree of temperature increase of the second refrigerant C2 along with the increase in the PT loss (slope of graph: the ratio of the amount of temperature increase to the amount of increase in the PT loss) in the case of a low PT passing flow rate (line L12) is higher than that in the case of a high PT passing flow rate (line L11).

In S15, the ECU 500 determines a temperature T22 (FIG. 2) of the second refrigerant C2 flowing into the heat exchanger 50 by using the temperature T21 obtained in S11 and ΔTloss obtained in S14. Specifically, the ECU 500 sets, for example, a value obtained by adding ΔTloss to the temperature T21 as the temperature T22. If the disadvantage in terms of cost can be accepted, a temperature sensor for actually measuring the temperature T22 may be provided in the second portion 20b.

In S16, the ECU 500 acquires the temperature T1 detected by the temperature sensor 13. The temperature T1 corresponds to the temperature of the first refrigerant C1 flowing into the heat exchanger 50. In S17, the ECU 500 determines a temperature difference ΔT between the temperature T22 and the temperature T1. The temperature difference ΔT corresponds to a value obtained by subtracting the temperature T1 from the temperature T22.

In S18, the ECU 500 acquires a requested cooling index indicating a requested cooling degree of the battery 12. Specifically, the ECU 500 acquires the requested cooling index based on the temperature of the battery 12, the magnitude of a load on the battery 12 requested for driving the vehicle, and the magnitude of a load on the battery 12 requested by the user. The requested cooling index increases as the current temperature of the battery 12 increases and the requested load on the battery 12 (for example, requested electric power) increases. The increase in the requested cooling index means an increase in the cooling degree of the battery 12 that is requested in the thermal management system.

In S19, the ECU 500 determines a target value of the flow rate of the second refrigerant C2 flowing into the second portion 20b (toward the heat exchanger 50) (hereinafter referred to as "target flow rate V"). Specifically, the ECU 500 acquires the target flow rate V based on the requested cooling index and the temperature difference ΔT by using, for example, a map (lines L21, L22) shown in FIG. 3. The ECU 500 basically increases the target flow rate V as the requested cooling index (requested cooling degree of the battery 12) decreases. If the amount of the second refrigerant C2 flowing into the heat exchanger 50 is increased when the temperature difference ΔT is large, the cooling effect of the first refrigerant C1 on the battery 12 decreases. Under the conditions that the requested cooling index is the same, the ECU 500 reduces the target flow rate V at the large temperature difference ΔT (line L21) compared to the target flow rate V at the small temperature difference ΔT (line L22).

Figure 5:
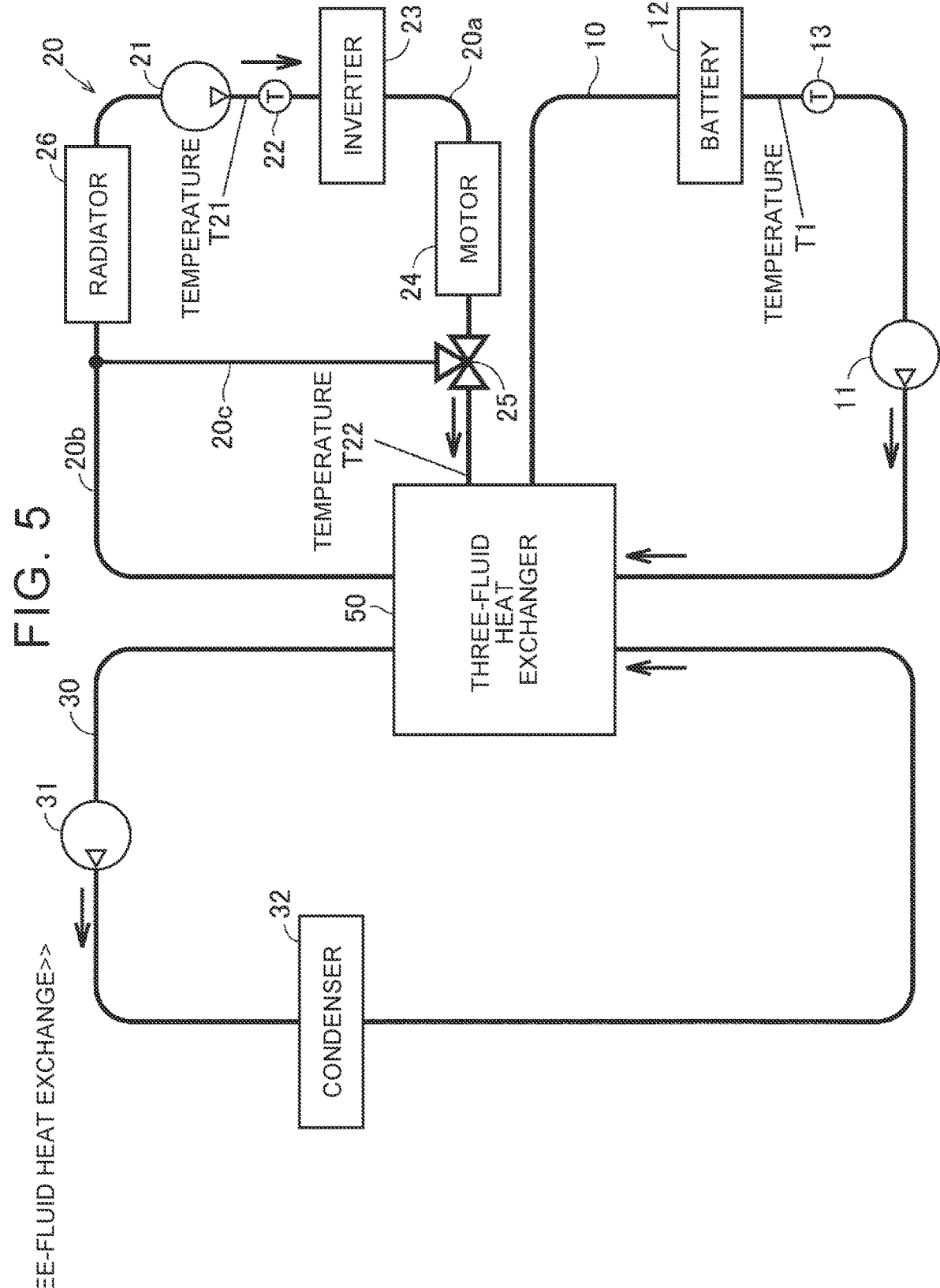
FIG. 5 shows a state of the thermal management system when three-fluid heat exchange is performed in the embodiment of the present disclosure.

In S20, the ECU 500 controls the regulating valve 25 to cause the amount of the second refrigerant C2 flowing into the second portion 20b to approach the target flow rate V determined in S19. Specifically, the ECU 500 determines a target opening degree of the regulating valve 25 based on the target flow rate V and the temperature T22 by using, for example, a map (lines L31, L32) shown in FIG. 3. The ECU 500 basically increases the opening degree of the regulating valve 25 as the target flow rate V increases. If the opening degree of the regulating valve 25 is increased when the temperature T22 of the second refrigerant C2 flowing into the heat exchanger 50 is high, the temperature of the first refrigerant C1 increases (or does not easily decrease) due to the heat exchange in the heat exchanger 50. Under the conditions that the target flow rate V is the same, the ECU 500 reduces the target opening degree of the regulating valve 25 at the high temperature T22 (line L31) compared to the target opening degree of the regulating valve 25 at the low temperature T22 (line L32). Then, the ECU 500 controls the regulating valve 25 to achieve the determined target opening degree. After the process of S20 is performed, the process returns to the initial step (S11). The ECU 500 repeats the processes of S11 to S20 during three-fluid heat exchange described later (while all the first pump 11, the second pump 21, and the third pump 31 are operating as shown in FIG. 5). Through such control, the ECU 500 regulates the opening degree of the regulating valve 25 based on the state of the vehicle.

As described above, the thermal management method according to the present embodiment includes acquiring the temperature of the first refrigerant C1 flowing into the heat exchanger 50 (S16), acquiring the temperature of the second refrigerant C2 flowing into the heat exchanger 50 (S15), acquiring the requested cooling index indicating the requested cooling degree of the battery 12 (power storage device) (S18), determining the target value of the flow rate of the second refrigerant C2 flowing into the second portion 20b (target flow rate V) by using the temperature of the first refrigerant C1, the temperature of the second refrigerant C2, and the requested cooling index (S19), and controlling the regulating valve 25 to cause the amount of the second refrigerant C2 flowing into the second portion 20b to approach the determined target value (S20).

According to the above method, it is easier to adjust the thermal balance (for example, the temperature difference ΔT) between the first refrigerant C1 and the second refrigerant C2 to an appropriate balance. Further, it is easier to control the heat exchange in the heat exchanger 50 to sufficiently cool the battery 12.

Figure 4:
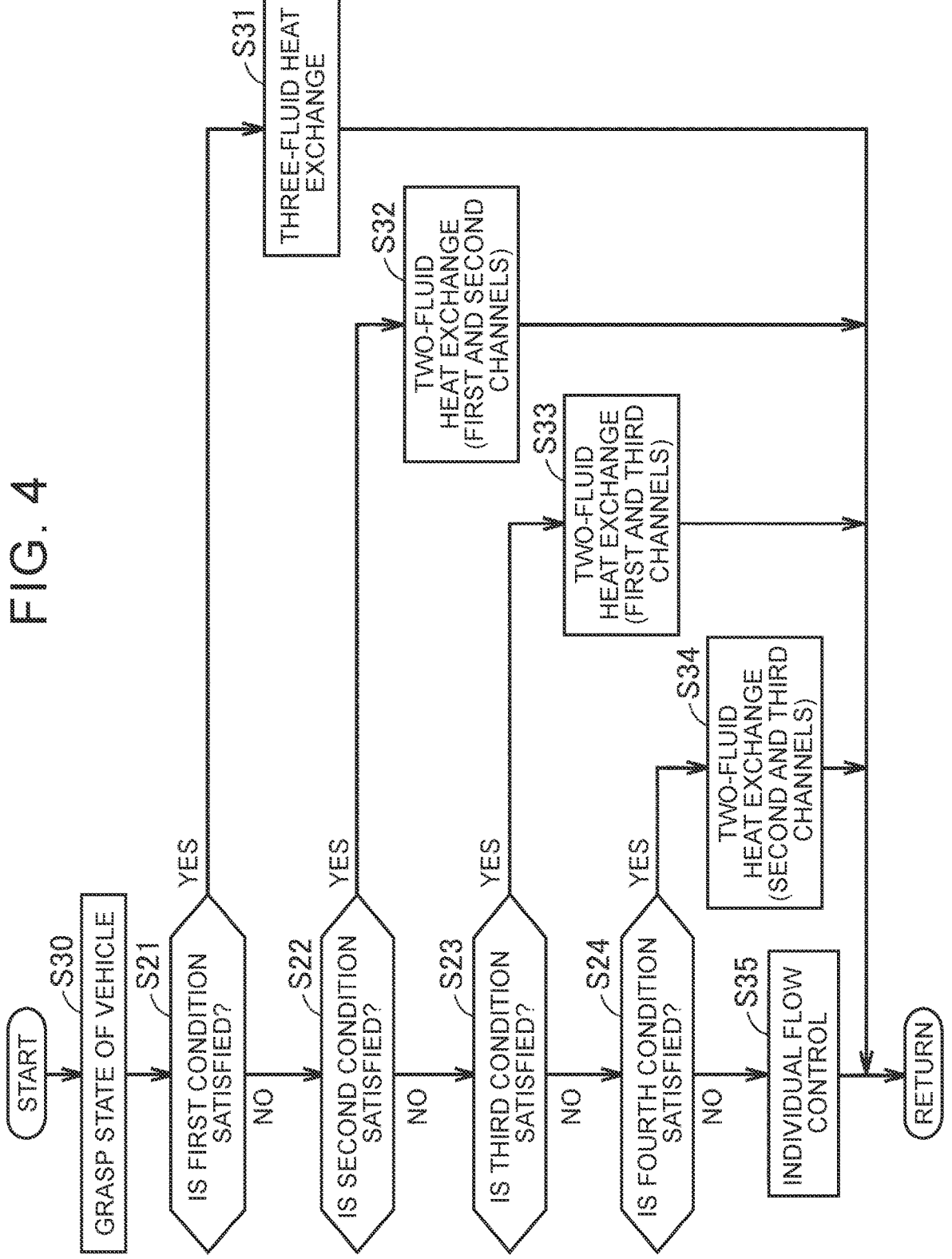
FIG. 4 is a flowchart showing a method for controlling pumps according to the embodiment of the present disclosure.

FIG. 4 is a flowchart showing a method for controlling the pumps according to the present embodiment. The process shown in this flowchart is repeated by the ECU 500 activated in response to a request from the user.

Referring to FIG. 4 together with FIGS. 1 and 2, the ECU 500 grasps the state of the vehicle in S30. Specifically, the ECU 500 determines whether each of a battery cooling request, a battery temperature increase request, and a heating request is made for the vehicle. This determination is made, for example, in the manner described below.

The ECU 500 determines whether the battery cooling request is made based on the requested cooling index. That is, the ECU 500 acquires the requested cooling index indicating the requested cooling degree of the battery 12 based on the state of the vehicle. The method for acquiring the requested cooling index is, for example, the same as that of S18 in FIG. 3. When the obtained requested cooling index exceeds a predetermined value (hereinafter referred to as "first reference value"), the ECU 500 determines that "the battery cooling request is made". When the requested cooling index does not exceed the first reference value, the ECU 500 determines that "the battery cooling request is not made".

The ECU 500 determines whether the battery temperature increase request is made based on the requested cooling index. The decrease in the requested cooling index means an increase in the degree of temperature increase of the battery 12 that is requested in the thermal management system. The requested cooling index may indicate the requested cooling degree of the battery 12 with a positive (+) value and the requested degree of temperature increase of the battery 12 with a negative (−) value. When the requested cooling index falls below a predetermined value (hereinafter referred to as "second reference value"), the ECU 500 determines that "the battery temperature increase request is made". When the requested cooling index does not fall below the second reference value, the ECU 500 determines that "the battery temperature increase request is not made". The second reference value is a value (negative value) smaller than the first reference value. When the requested cooling index is equal to or larger than the second reference value and equal to or smaller than the first reference value, the ECU 500 determines that neither the battery cooling request nor the battery temperature increase request is made (no battery temperature control request is made).

The ECU 500 determines whether the heating request is made based on a requested heating index. That is, the ECU 500 acquires the requested heating index indicating the requested heating degree of the interior of the vehicle based on the state of the vehicle. Specifically, the ECU 500 acquires the requested heating index based on a vehicle interior temperature, an outside air temperature, and a target air conditioning temperature. The target air conditioning temperature is set, for example, for the air conditioner by the user. The requested heating index increases as the current vehicle interior temperature decreases, the outside air temperature decreases, and the target air conditioning temperature increases. The increase in the requested heating index means an increase in the heating degree of the interior of the vehicle that is requested in the thermal management system. When the requested heating index exceeds a predetermined value (hereinafter referred to as "third reference value"), the ECU 500 determines that "the heating request is made". When the requested heating index does not exceed the third reference value, the ECU 500 determines that "the heating request is not made".

In S21 to S24 described below, the ECU 500 determines whether first to fourth conditions are satisfied based on the results of the determination (S30).

In S21, the ECU 500 determines whether a predetermined first condition is satisfied. A specific example of the first condition will be described later. The first condition is related to the state of the vehicle, and corresponds to a permission condition related to heat exchange in S31. When the first condition is satisfied (YES in S21), the ECU 500 performs three-fluid heat exchange in S31.

FIG. 5 shows a state of the thermal management system when the three-fluid heat exchange is performed. As shown in FIG. 5, the ECU 500 operates all the first pump 11, the second pump 21, and the third pump 31 and controls the regulating valve 25 to cause the second refrigerant C2 to flow into the second portion 20*b* (including the heat exchanger 50) in S31 of FIG. 4. Specifically, the ECU 500 controls the regulating valve 25 through the series of processes shown in FIG. 4. In the heat exchanger 50, mutual heat exchange is performed among the first channel 10 (first refrigerant C1), the second channel 20 (second refrigerant C2), and the third channel 30 (third refrigerant C3) (see FIG. 1). According to such three-fluid heat exchange, the battery 12 together with the drive device (inverter 23 and motor 24) of the vehicle can be cooled by at least one of the refrigeration cycle (third refrigerant C3) of the air conditioner and the radiator 26 (second refrigerant C2). During the three-fluid heat exchange, the interior of the vehicle can be heated by the heat pump system of the air conditioner. More specifically, the heat pump system can heat the interior of the vehicle by using at least one of outside air heat absorption, battery waste heat, and powertrain waste heat. During the three-fluid heat exchange, the thermal balance between the first refrigerant C1 and the second refrigerant C2 is adjusted by repeating the processes of S11 to S20 in FIG. 3.

The first condition (S21 in FIG. 4) according to the present embodiment is satisfied when both the conditions that "the battery cooling request is made" and "the heating request is made" are satisfied. The first condition is not satisfied when neither is satisfied. When only the condition that "the battery cooling request is made" is satisfied out of the conditions that "the battery cooling request is made" and "the heating request is made", the first condition is satisfied if the three-fluid heat exchange (see FIG. 5) is a battery cooling method with the highest efficiency than any other method (for example, a battery cooling method by two-fluid heat exchange described later). The first condition is not satisfied if there is any other battery cooling method with higher efficiency than that of the three-fluid heat exchange. When only the condition that "the heating request is made" is satisfied out of the conditions that "the battery cooling request is made" and "the heating request is made", the first condition is satisfied if the three-fluid heat exchange is a heating method with the highest efficiency than any other method (for example, a heating method by two-fluid heat exchange described later). The first condition is not satisfied if there is any other heating method with higher efficiency than that of the three-fluid heat exchange.

The ECU 500 may determine an energy efficiency of each battery cooling method based on at least one of an air conditioning request (for example, the requested heating index), available electric power, an outside air temperature, a battery temperature, a powertrain temperature, powertrain waste heat, temperatures of the refrigerants, and pressures of the refrigerants. The ECU 500 may determine an energy efficiency of each heating method based on at least one of the battery temperature control request (for example, the requested cooling index), the available electric power, the outside air temperature, the battery temperature, the powertrain temperature, the powertrain waste heat, the temperatures of the refrigerants, and the pressures of the refrigerants.

Referring again to FIG. 4 together with FIGS. 1 and 2, when the first condition is not satisfied (NO in S21), the ECU 500 determines in S22 whether a predetermined second condition is satisfied. A specific example of the second condition will be described later. The second condition is related to the state of the vehicle, and corresponds to a permission condition related to heat exchange in S32. When the second condition is satisfied (YES in S22), the ECU 500 performs two-fluid heat exchange between the first and second channels in S32.

Figure 6:
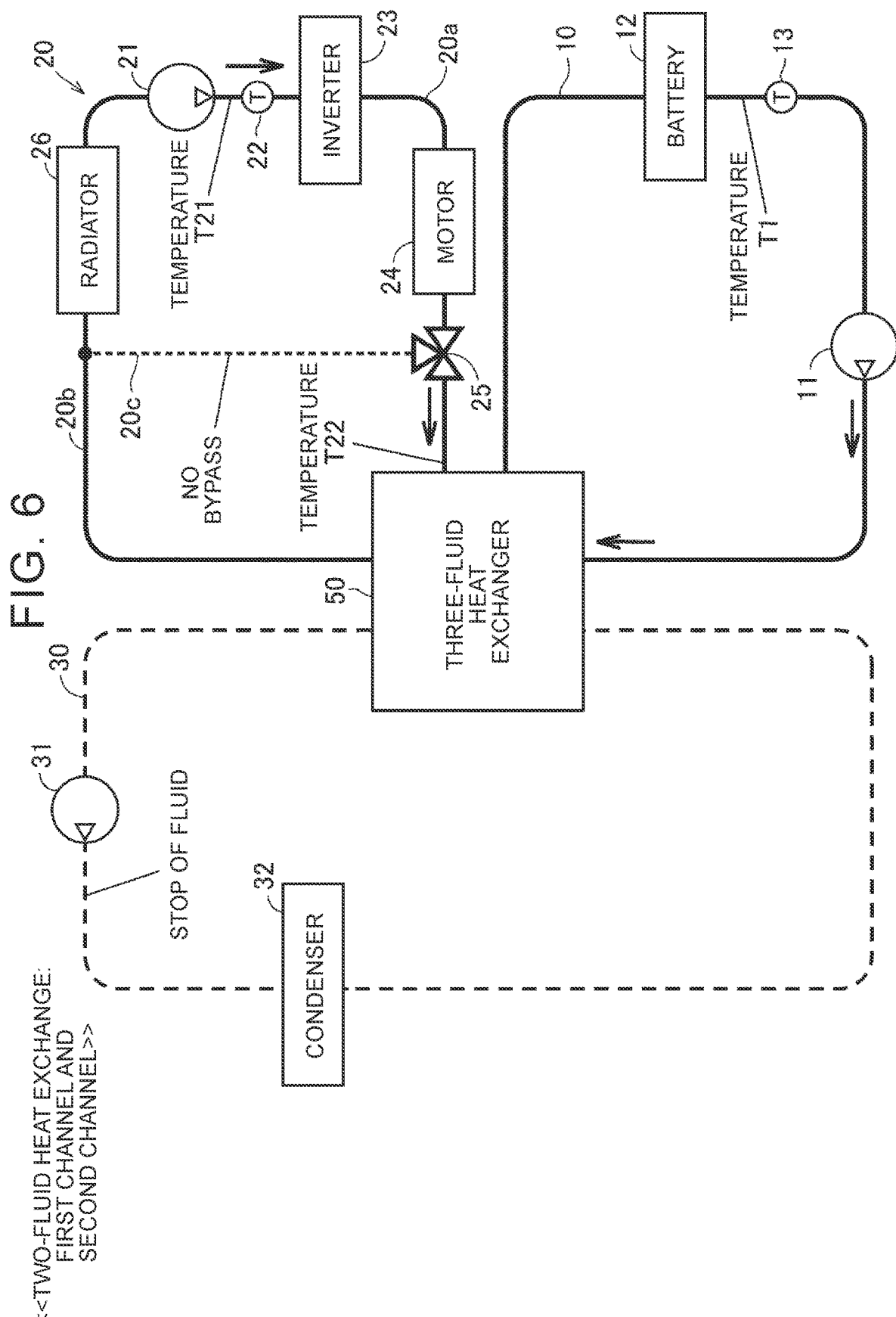
FIG. 6 shows a state of the thermal management system when two-fluid heat exchange is performed between first and second channels in the embodiment of the present disclosure.

FIG. 6 shows a state of the thermal management system when the two-fluid heat exchange is performed between the first and second channels. As shown in FIG. 6, the ECU 500 stops the third pump 31, operates the first pump 11 and the second pump 21, and controls the regulating valve 25 to cause the second refrigerant C2 to flow into the second portion 20*b* (including the heat exchanger 50) in S32 of FIG. 4. For example, the ECU 500 sets the bypass amount to zero (no bypass) by fully opening the regulating valve 25. In the heat exchanger 50, mutual heat exchange is performed between the first channel 10 (first refrigerant C1) and the second channel 20 (second refrigerant C2). According to such two-fluid heat exchange, the battery 12 together with the drive device (inverter 23 and motor 24) of the vehicle can be cooled by the radiator 26 (second refrigerant C2). During the two-fluid heat exchange between the first and second channels, the battery 12 may be heated by an on-vehicle heat source (for example, at least one of powertrain waste heat, waste heat of the refrigeration cycle of the air conditioner, and an electric heater).

The second condition (S22 in FIG. 4) according to the present embodiment is satisfied when the condition that "the battery temperature increase request is made" is satisfied. When the condition that "the battery cooling request is made" is satisfied, the second condition is satisfied if the two-fluid heat exchange between the first and second channels (see FIG. 6) is a battery cooling method with the highest efficiency than any other method (for example, the battery cooling method by the three-fluid heat exchange described above and a battery cooling method by two-fluid heat exchange between the first and third channels described later). The second condition is not satisfied if there is any other battery cooling method with higher efficiency than that of the two-fluid heat exchange between the first and second channels. When neither of the conditions that "the battery cooling request is made" and "the battery temperature increase request is made" is satisfied, the second condition is not satisfied.

Referring again to FIG. 4 together with FIGS. 1 and 2, when the second condition is not satisfied (NO in S22), the ECU 500 determines in S23 whether a predetermined third condition is satisfied. A specific example of the third condition will be described later. The third condition is related to the state of the vehicle, and corresponds to a permission condition related to heat exchange in S33. When the third condition is satisfied (YES in S23), the ECU 500 performs two-fluid heat exchange between the first and third channels in S33.

Figure 7:
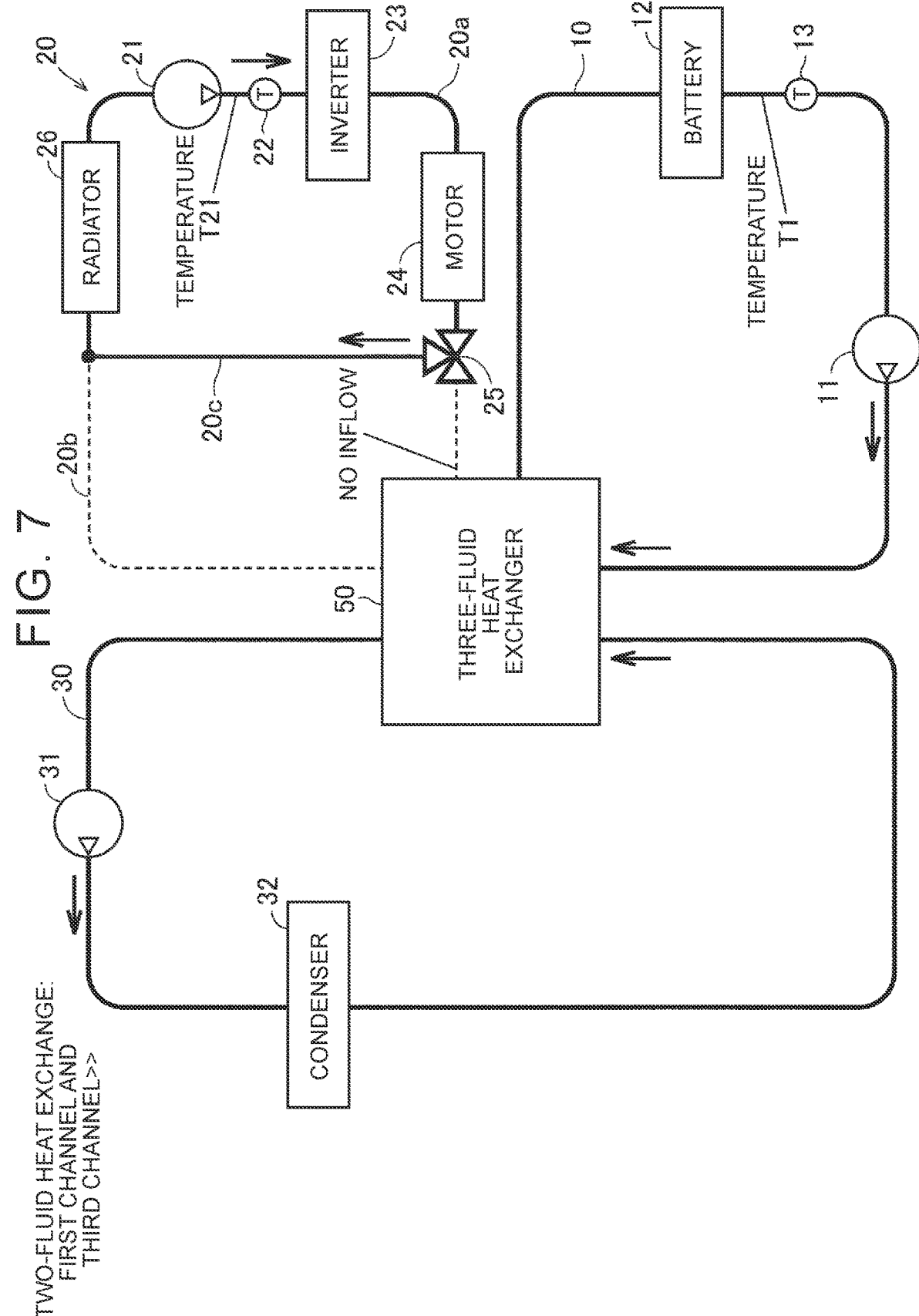
FIG. 7 shows a state of the thermal management system when two-fluid heat exchange is performed between first and third channels in the embodiment of the present disclosure.

FIG. 7 shows a state of the thermal management system when the two-fluid heat exchange is performed between the first and third channels. As shown in FIG. 7, the ECU 500 operates all the first pump 11, the second pump 21, and the third pump 31 and controls the regulating valve 25 to cause the second refrigerant C2 not to flow into the second portion 20*b* (toward the heat exchanger 50) in S33 of FIG. 4. For example, the ECU 500 sets the non-bypass amount to zero (no inflow into the heat exchanger 50) by fully closing the regulating valve 25. In the heat exchanger 50, mutual heat exchange is performed between the first channel 10 (first refrigerant C1) and the third channel 30 (third refrigerant C3). According to such two-fluid heat exchange, the battery 12 can be cooled by the refrigeration cycle (third refrigerant C3) of the air conditioner. During the two-fluid heat exchange between the first and third channels, the interior of the vehicle can be heated by the heat pump system of the air conditioner. The heat pump system can heat the interior of the vehicle by using, for example, battery waste heat. Since the second refrigerant C2 flows through the first portion 20*a* of the second fluid circuit as shown in FIG. 7, the drive device (inverter 23 and motor 24) of the vehicle can be cooled by the radiator 26 (second refrigerant C2).

The third condition (S23 in FIG. 4) according to the present embodiment can be satisfied when either of the conditions that "the battery cooling request is made" and "the heating request is made" is satisfied. When the condition that "the battery cooling request is made" is satisfied, the third condition is satisfied if the two-fluid heat exchange between the first and third channels (see FIG. 7) is a battery cooling method with the highest efficiency than any other method (for example, the battery cooling method by the three-fluid heat exchange described above and the battery cooling method by the two-fluid heat exchange between the first and second channels described above). The third condition is not satisfied if there is any other battery cooling method with higher efficiency than that of the two-fluid heat exchange between the first and third channels. When the condition that "the heating request is made" is satisfied, the third condition is satisfied if the two-fluid heat exchange between the first and third channels (see FIG. 7) is a heating method with the highest efficiency than any other method (for example, the heating method by the three-fluid heat exchange described above and a heating method by two-fluid heat exchange between the second and third channels described later). The third condition is not satisfied if there is any other heating method with higher efficiency than that of the two-fluid heat exchange between the first and third channels. When neither of the conditions that "the battery cooling request is made" and "the heating request is made" is satisfied, the third condition is not satisfied.

Referring again to FIG. 4 together with FIGS. 1 and 2, when the third condition is not satisfied (NO in S23), the ECU 500 determines in S24 whether a predetermined fourth condition is satisfied. A specific example of the fourth condition will be described later. The fourth condition is related to the state of the vehicle, and corresponds to a permission condition related to heat exchange in S34. When the fourth condition is satisfied (YES in S24), the ECU 500 performs two-fluid heat exchange between the second and third channels in S34.

Figure 8:
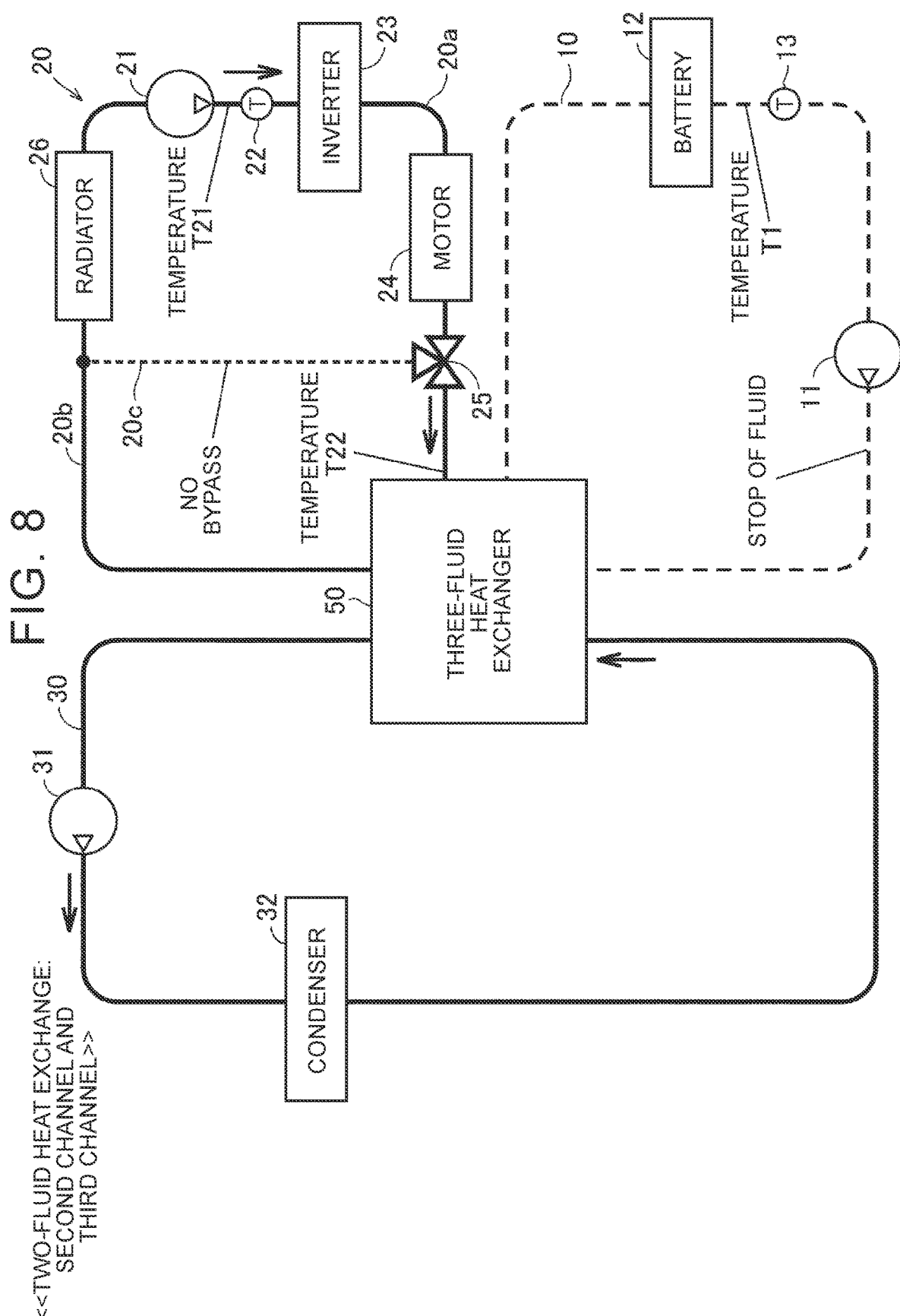
FIG. 8 shows a state of the thermal management system when two-fluid heat exchange is performed between second and third channels in the embodiment of the present disclosure.

FIG. 8 shows a state of the thermal management system when the two-fluid heat exchange is performed between the second and third channels. As shown in FIG. 8, the ECU 500 stops the first pump 11, operates the second pump 21 and the third pump 31, and controls the regulating valve 25 to cause the second refrigerant C2 to flow into the second portion 20*b* (including the heat exchanger 50) in S34 of FIG. 4. For example, the ECU 500 sets the bypass amount to zero (no bypass) by fully opening the regulating valve 25. In the heat exchanger 50, mutual heat exchange is performed between the second channel 20 (second refrigerant C2) and the third channel 30 (third refrigerant C3). According to such two-fluid heat exchange, the drive device (inverter 23 and motor 24) of the vehicle can be cooled by at least one of the refrigeration cycle (third refrigerant C3) of the air conditioner and the radiator 26 (second refrigerant C2). During the two-fluid heat exchange between the second and third channels, the interior of the vehicle can be heated by the heat pump system of the air conditioner. More specifically, the heat pump system can heat the interior of the vehicle by using at least one of outside air heat absorption and powertrain waste heat.

The fourth condition (S24 in FIG. 4) according to the present embodiment can be satisfied when the condition that "the heating request is made" is satisfied. When the condition that "the heating request is made" is satisfied, the fourth condition is satisfied if the two-fluid heat exchange between the second and third channels (see FIG. 8) is a heating method with the highest efficiency than any other method (for example, the heating method by the three-fluid heat exchange described above and the heating method by the two-fluid heat exchange between the first and third channels described above). The fourth condition is not satisfied if there is any other heating method with higher efficiency than that of the two-fluid heat exchange between the second and third channels. When the condition that "the heating request is made" is not satisfied, the fourth condition is not satisfied.

Referring again to FIG. 4 together with FIGS. 1 and 2, when the fourth condition is not satisfied (NO in S24), the ECU 500 performs individual flow control in S35. When refrigerant flow is requested for a purpose other than the battery temperature control and the air conditioning, the ECU 500 performs the requested refrigerant flow through pump control. For example, in a situation where the cooling of the drive device of the vehicle is requested (for example, during the traveling of the vehicle), the ECU 500 fully closes the regulating valve 25 (no inflow into the heat exchanger 50) and operates the second pump 21. The ECU 500 may perform the refrigerant flow for the purpose of achieving uniform temperature. When the refrigerant flow is not requested, the ECU 500 stops all the first pump 11, the second pump 21, and the third pump 31.

After any one of the processes of S31 to S35 is performed, the process returns to the initial step (S30). The thermal management mode (S31, S32, S33, S34, S35) is switched depending on the state of the vehicle by the ECU 500 repeating the series of processes shown in FIG. 4. Thus, it is possible to perform appropriate thermal management depending on the state of the vehicle.

As described above, the thermal management method according to the present embodiment includes the processes shown in FIGS. 3 and 4. In the present embodiment, the ECU 500 is an example of a "computer device" according to the present disclosure. Each process is performed by one or more processors executing programs stored in one or more memories. These processes may be performed by dedicated hardware (electronic circuitry) instead of software.

The thermal management method according to the present embodiment includes operating all the first pump 11, the second pump 21, and the third pump 31 and controlling the regulating valve 25 to cause the second refrigerant C2 to flow into the second portion 20b when the first condition related to the state of the vehicle is satisfied (see S31 in FIG. 4 and FIG. 5), stopping the third pump 31, operating the first pump 11 and the second pump 21, and controlling the regulating valve 25 to cause the second refrigerant C2 to flow into the second portion 20b when the first condition is not satisfied and the second condition related to the state of the vehicle is satisfied (see S32 in FIG. 4 and FIG. 6), operating all the first pump 11, the second pump 21, and the third pump 31 and controlling the regulating valve 25 to cause the second refrigerant C2 not to flow into the second portion 20b when the first condition is not satisfied and the third condition related to the state of the vehicle is satisfied (see S33 in FIG. 4 and FIG. 7), and stopping the first pump 11, operating the second pump 21 and the third pump 31, and controlling the regulating valve 25 to cause the second refrigerant C2 to flow into the second portion 20b when the first condition is not satisfied and the fourth condition related to the state of the vehicle is satisfied (see S34 in FIG. 4 and FIG. 8).

According to the above method, it is possible to change the mode of heat exchange in the heat exchanger 50 depending on the state of the vehicle. Thus, it is easier to perform thermal management appropriate to the state of the vehicle.

Figure 9:
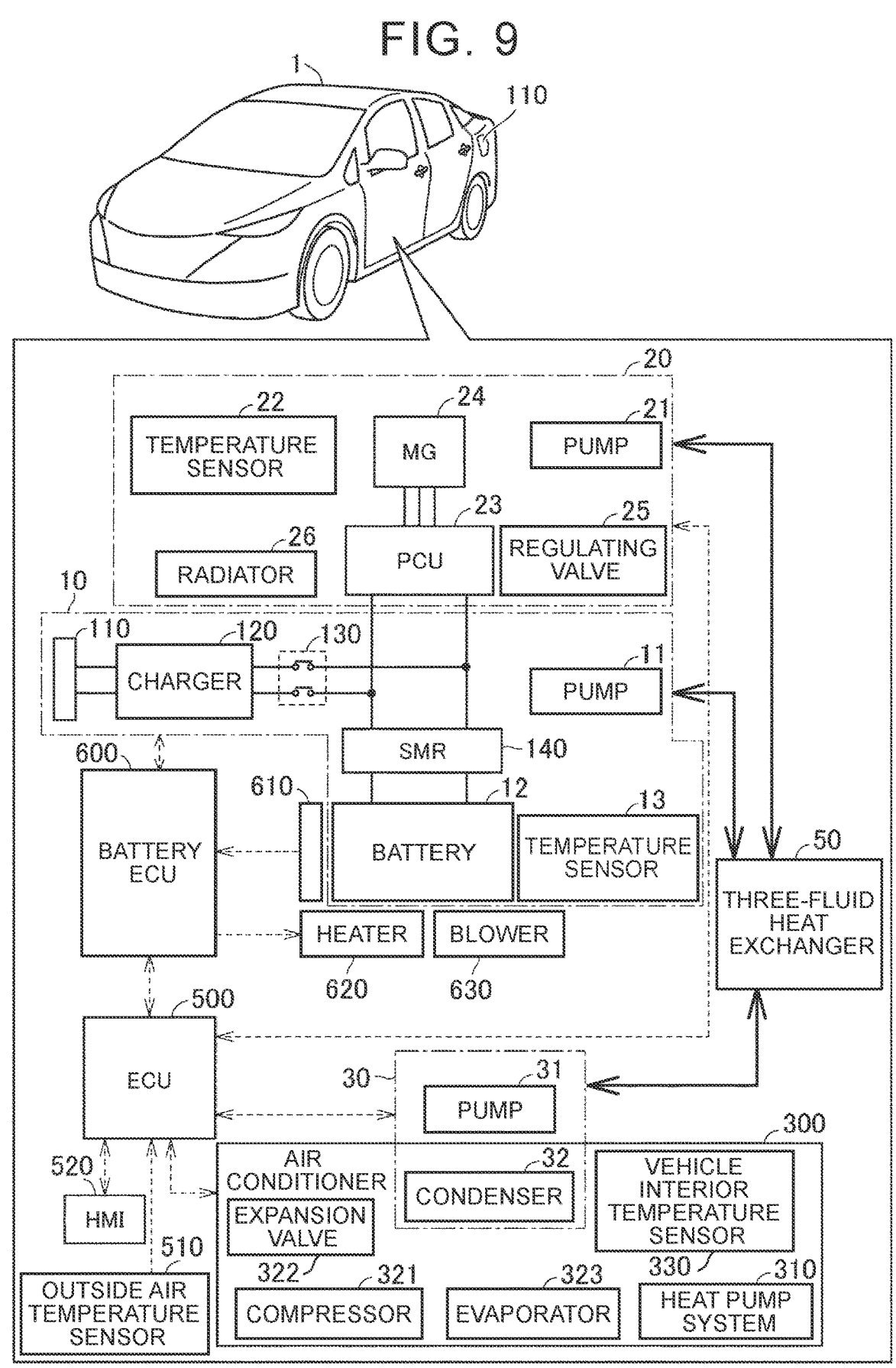
FIG. 9 shows an example of the configuration of a vehicle including the thermal management system according to the embodiment of the present disclosure.

FIG. 9 shows an example of the configuration of a vehicle including the thermal management system (see FIGS. 1 and 2). Referring to FIG. 9 together with FIGS. 1 and 2, a vehicle 1 includes the ECU 500, a battery ECU 600, the first pump 11, the battery 12, the temperature sensor 13, an inlet 110, a charger 120, a charging relay 130, a system main relay (SMR) 140, the second pump 21, the temperature sensor 22, the inverter 23, the motor 24, the regulating valve 25, the radiator 26, an air conditioner 300, the third pump 31, an outside air temperature sensor 510, a human-machine interface (HMI) 520, and the heat exchanger 50. The ECU 500 and the battery ECU 600 are configured to communicate with each other. These ECUs are connected by, for example, a controller area network (CAN). Auxiliary devices (including each ECU) mounted on the vehicle 1 are supplied with electric power from an auxiliary device battery (not shown). When the remaining charge level of the auxiliary device battery is low, electric power is supplied from the battery 12 to the auxiliary device battery.

The vehicle 1 is configured to travel with the electric power in the battery 12. Examples of the vehicle 1 include a BEV without an internal combustion engine. The battery 12 may be a known power storage device for vehicles (for example, a liquid secondary battery or an all-solid-state secondary battery). Examples of the secondary batteries for vehicles include a lithium-ion battery and a nickel metal hydride battery.

The battery 12 is provided with a battery management system (BMS) 610, a heater 620, and a blower 630. The BMS 610 includes sensors for detecting the state of the battery 12 (for example, temperature, current, and voltage). The detection results from the BMS 610 are output to the battery ECU 600. The temperature detected by the temperature sensor 13 is also output to the battery ECU 600. The battery ECU 600 transmits the state of the battery 12 and the detected value (temperature T1) of the temperature sensor 13 to the ECU 500, and controls the first pump 11, the charger 120, the charging relay 130, the SMR 140, the heater 620, and the blower 630 in response to instructions from the ECU 500. The ECU 500 operates the heater 620 when quick heating of the battery 12 is requested, and operates the blower 630 when quick cooling of the battery 12 is requested. In a normal state (state in which neither the quick heating nor the quick cooling is requested), the ECU 500 controls the temperature of the battery 12 by the heat exchange described above (see FIGS. 3 and 4).

In the example shown in FIG. 9, heat sources (objects to be cooled) in the first channel 10 include the inlet 110, the charger 120, the charging relay 130, and the SMR 140 in addition to the battery 12. These heat sources are disposed near the first fluid circuit (first channel 10) so as to be cooled by the first refrigerant C1. The heat sources (objects to be cooled) and the first channel 10 (pipe) may be in contact with each other. The inlet 110 is configured such that a plug (for example, a connector of a charging cable) for external charging (charging of the battery 12 with electric power from the outside of the vehicle) can be attached and detached. The charger 120 includes a power conversion circuit for the external charging. The charging relay 130 switches connection and disconnection of a charging line. The external charging is prohibited when the charging relay 130 is disconnected. The SMR 140 switches connection and disconnection of a basic line of the battery 12. When the SMR 140 is disconnected, the use (charging and discharging) of the battery 12 is prohibited.

The inverter 23 functions as a power control unit (PCU) for the motor 24. The PCU corresponds to a drive circuit for the motor 24. The inverter 23 drives the motor 24 by using electric power supplied from the battery 12. The inverter 23 is controlled by the ECU 500. The motor 24 functions as a motor generator (MG). The motor 24 is driven by the inverter 23 and rotates driving wheels of the vehicle 1. The motor 24 also regeneratively generates electric power and supplies the generated electric power to the battery 12.

The air conditioner 300 conditions air in the vehicle (in the interior of the vehicle 1) through the refrigeration cycle. The air conditioner 300 includes a heat pump system 310, the condenser 32, a compressor 321, an expansion valve 322, an evaporator 323, and a vehicle interior temperature sensor 330. The vehicle interior temperature (temperature in a vehicle cabin) detected by the vehicle interior temperature sensor 330 is output to the ECU 500. The outside air temperature (temperature of outside air around the vehicle) detected by the outside air temperature sensor 510 is also output to the ECU 500. The air conditioner 300 is controlled by the ECU 500. The user can set a target air conditioning temperature for the air conditioner 300 through the HMI 520. The HMI 520 includes an input device and a display device. The HMI 520 may include a touch panel display. The HMI 520 may include a smart speaker that receives voice input. The ECU 500 controls the air conditioner 300 based on, for example, the vehicle interior temperature, the outside air temperature, and the target air conditioning temperature to cause the vehicle interior temperature to approach the target air conditioning temperature.

In the vehicle 1 shown in FIG. 9, the first channel 10, the second channel 20, and the third channel 30 are formed independently of each other. The heat exchanger 50 is connected to the first channel 10, the second channel 20, and the third channel 30 (see FIGS. 1 and 2). The heat exchanger 50 mutually exchanges heat among the first refrigerant C1 flowing through the first fluid circuit (first channel 10), the second refrigerant C2 flowing through the second fluid circuit (second channel 20), and the third refrigerant C3 flowing through the third fluid circuit (third channel 30). According to such a configuration, the power storage device (battery 12) and the drive device (inverter 23 and motor 24) can be cooled by the third refrigerant C3 cooled by the refrigeration cycle of the air conditioner 300 because the heat exchanger 50 exchanges heat among the first to third refrigerants. Since the first channel 10, the second channel 20, and the third channel 30 are formed independently of each other, it is easier to individually regulate the channels to appropriate temperatures. Thus, it is possible to appropriately perform wide-range thermal management for the vehicle 1 (for example, thermal management in a range including the battery 12, the inverter 23, and the motor 24). Since all the first to third refrigerants flow into the common heat exchanger 50 and heat is exchanged among the first to third refrigerants by one heat exchanger 50, the structure of the thermal management system is simplified and the cost is reduced.

Although one three-way valve is employed as the regulating valve 25 in the above embodiment, a function similar to that of the regulating valve 25 may be implemented by a plurality of two-way valves. It is not essential to use different types of refrigerant as the first to third refrigerants. For example, water or an aqueous solution may be employed as each of the first refrigerant C1 and the second refrigerant C2, and a refrigerant other than a coolant (water or an aqueous solution) may be employed as the third refrigerant C3.

The heat sources (objects to be cooled) and the heat dissipation units in the first to third channels may be changed or added as appropriate. For example, at least one of an electric heater and an internal combustion engine may be provided in the second channel 20 as a heat source (object to be cooled). A heat dissipation device other than the radiator may be provided in the second channel 20.

The processing flows shown in FIGS. 3 and 4 may be changed as appropriate. For example, the order of processes may be changed or unnecessary steps may be omitted depending on purposes. The details of any one of the processes may be changed.

The configuration of the vehicle is not limited to the configuration described above (see FIG. 9). The vehicle may be an electrified vehicle other than the BEV. The vehicle may include an internal combustion engine (for example, a gasoline engine, a biofuel engine, or a hydrogen engine). The vehicle is not limited to the four-wheeled passenger car, and may be a bus, a truck, or an electrified vehicle with three, five, or more wheels. The vehicle may include a solar panel. The vehicle may be chargeable wirelessly. The vehicle may be capable of autonomous driving or may have a flying function. The vehicle may be a vehicle capable of unmanned driving (for example, a robotaxi, an automated guided vehicle, or an agricultural machine).

The embodiment disclosed herein should be considered as illustrative and not restrictive in all respects. The scope of the present disclosure is shown by the claims rather than by the above description of the embodiment, and is intended to include all modifications within the meaning and scope equivalent to those of the claims.

What is claimed is:

1. A thermal management system comprising:
a first channel through which a first refrigerant flows so as to cool a power storage device mounted on a vehicle;
a second channel through which a second refrigerant flows so as to cool a drive device that causes the vehicle to travel;
a third channel through which a third refrigerant that is cooled by a refrigeration cycle flows; and
a heat exchanger connected to the first channel, the second channel, and the third channel, wherein
the first channel, the second channel, and the third channel are provided independently of each other,
the heat exchanger is configured to mutually exchange heat among the first refrigerant, the second refrigerant, and the third refrigerant.refrigerant, and
the second channel includes:
a first portion passing through the drive device,
a second portion passing through the heat exchanger from a first end of the first portion and connected to a second end of the first portion, and
a third portion connected to the second end of the first portion from the first end of the first portion without passing through the heat exchanger.

2. The thermal management system according to claim 1, further comprising an air conditioner configured to condition air in an interior of the vehicle through the refrigeration cycle, wherein:

the first refrigerant is insulating oil;

the second refrigerant is water or an aqueous solution; and the third refrigerant is a refrigerant that is used so as to condition the air.

3. The thermal management system according to claim 1, further comprising:

a first pump configured to circulate the first refrigerant in a first fluid circuit provided by the first channel;

a second pump configured to circulate the second refrigerant in a second fluid circuit provided by the second channel; and a third pump configured to circulate the third refrigerant in a third fluid circuit provided by the third channel.

4. The thermal management system according to claim 3, further comprising a regulating valve, wherein:

the regulating valve is configured to regulate a ratio between an amount of the second refrigerant flowing into the second portion and an amount of the second refrigerant flowing into the third portion.

5. The thermal management system according to claim 4, wherein the regulating valve is a three-way valve connected to the first portion, the second portion, and the third portion.

6. The thermal management system according to claim 4, further comprising:

a first temperature sensor configured to detect, in the first fluid circuit, a temperature of the first refrigerant pumped out by the first pump after passage through the heat exchanger and the power storage device;

a second temperature sensor configured to detect, in the second fluid circuit, a temperature of the second refrigerant pumped out by the second pump before passage through the drive device; and a control device configured to control the regulating valve by using the temperature detected by the first temperature sensor and the temperature detected by the second temperature sensor.

7. The thermal management system according to claim 6, wherein the control device is configured to acquire a requested cooling index indicating a requested cooling degree of the power storage device, determine a target flow rate by using the temperature detected by the first temperature sensor, the temperature detected by the second temperature sensor, and the requested cooling index, and control the regulating valve so as to cause the amount of the second refrigerant flowing into the second portion to approach the target flow rate.

8. A thermal management method for managing heat in the vehicle by using the thermal management system according to claim 4, the thermal management method comprising:

operating all the first pump, the second pump, and the third pump and controlling the regulating valve so as to cause the second refrigerant to flow into the second portion when a first condition related to a state of the vehicle is satisfied;

stopping the third pump, operating the first pump and the second pump, and controlling the regulating valve so as to cause the second refrigerant to flow into the second portion when the first condition is not satisfied and a second condition related to the state of the vehicle is satisfied;

operating all the first pump, the second pump, and the third pump and controlling the regulating valve to cause the second refrigerant not to flow into the second portion when the first condition is not satisfied and a third condition related to the state of the vehicle is satisfied; and stopping the first pump, operating the second pump and the third pump, and controlling the regulating valve so as to cause the second refrigerant to flow into the second portion when the first condition is not satisfied and a fourth condition related to the state of the vehicle is satisfied.

9. A computer device comprising:

a processor; and a storage device storing a program which causes the processor to execute the thermal management method according to claim 8.

10. A thermal management method for managing heat in the vehicle by using the thermal management system according to claim 4, the thermal management method comprising:

acquiring a temperature of the first refrigerant flowing into the heat exchanger;

acquiring a temperature of the second refrigerant flowing into the heat exchanger;

acquiring a requested cooling index indicating a requested cooling degree of the power storage device;

determining a target value of a flow rate of the second refrigerant flowing into the second portion by using the temperature of the first refrigerant, the temperature of the second refrigerant, and the requested cooling index; and controlling the regulating valve so as to cause the amount of the second refrigerant flowing into the second portion to approach the determined target value.

11. The thermal management system according to claim 1, wherein a heat exchanger is absent in a fluid circuit formed by the first portion and the third portion of the second channel.

* * * * *